United States Patent [19]
Walker

[11] Patent Number: 5,157,652
[45] Date of Patent: Oct. 20, 1992

[54] MEASUREMENT OF CHARACTERISTICS OF BROADCAST OPTICAL NETWORKS

[75] Inventor: Stuart D. Walker, Colchester, England

[73] Assignee: Hewlett-Packard Company, Palo Alto, Calif.

[21] Appl. No.: 557,680

[22] Filed: Jul. 24, 1990

[30] Foreign Application Priority Data

Jul. 28, 1989 [EP] European Pat. Off. ........ 89307714.9

[51] Int. Cl.⁵ ............................ H04J 1/16; H04J 3/14
[52] U.S. Cl. ...................................... 370/17; 375/10; 359/110
[58] Field of Search ............. 370/13, 17, 1, 2, 3, 370/4; 375/10; 455/600, 608; 359/109, 110

[56] References Cited

U.S. PATENT DOCUMENTS

| | | |
|---|---|---|
| 3,396,240 | 8/1968 | Abbey et al. .......................... 375/10 |
| 3,718,813 | 2/1973 | Williams, Jr. et al. ............... 375/10 |
| 3,875,500 | 4/1975 | Fletcher et al. ....................... 375/10 |
| 4,246,608 | 1/1981 | Baker ..................................... 375/10 |
| 4,377,822 | 3/1983 | Noirel et al. .......................... 370/17 |
| 4,384,354 | 5/1983 | Crawford et al. .................... 375/10 |

Primary Examiner—Douglas W. Olms
Assistant Examiner—Wellington Chin

[57] ABSTRACT

The present invention provides techniques for analyzing sub-carrier multiplexed (SCM) networks in which a pseudo-random binary sequence (PRBS) test signal is applied to a component or components of the network and the resulting signal is analyzed. A phase locked loop circuit extracts the PRBS and provides a signal which removes from the test signal the frequency component corresponding to the channel under investigation. The spectral properties of the PRBS enable broadband analysis of an SCM network to be carried out.

16 Claims, 6 Drawing Sheets

MEASUREMENT OF CHARACTERISTICS OF BROADCAST OPTICAL NETWORKS

FIELD OF THE INVENTION

The present invention relates to measurement techniques which enable the performance of an optical transmission network to be assessed. The invention has particular application to networks which use sub-carrier multiplexing (SCM).

BACKGROUND OF THE INVENTION

Sub-carrier multiplexed broadcast optical networks are of interest because they offer a cost effective means of information transmission in local and larger area networks. In a sub-carrier multiplexing arrangement an optical carrier is intensity modulated by microwave sub-carriers. Data from each user or channel is used to modulate (e.g., ASK, PSK or FSK in the case of a digital system or by FM for an analog system) a separate microwave frequency sub-carrier. The term "sub-carrier multiplexing" is generally used to refer to microwave sub-carriers and optical carriers and to distinguish them from optical frequency division multiplexing. A high speed photodetector receives the sum of all transmitted subcarrier channels and the desired channel is selected with a microwave band pass filter or RF heterodyne receiver.

Investigations have shown that the components which make up a sub-carrier multiplex network suffer from non-linear effects which lead to distortion. The present invention is concerned with measurement techniques which enable the distortion in such a network to be evaluated. The overall distortion of such a network is made up of a number of contributions, typically from the up and down conversion mixers, laser drive, laser, the receiver and, in some instances, a laser amplifier.

Distortion measurement techniques are known in frequency division multiplex systems and operate by using standardized white noise generators. A white noise test signal is input at base band or at an intermediate frequency with a measurement slot created by a filter. Intermodulation products created by the channel are transmitted in the measurement slot and detected at a receiving terminal. This technique could be applied to SCM optical systems, but it provides little information regarding the distortion characteristics of individual system components. Additional difficulties are introduced when full band width loading is required as there is a need for an array of frequency up/down converters, each with white noise loading and an appropriate tracking filter.

SUMMARY OF THE INVENTION

The present invention provides measurement techniques which do not suffer from these limitations.

According to one aspect of the invention, a method and apparatus for measuring characteristics of an optical transmission network is provided in which a test signal is applied to a device under test and the resulting output from the device is analyzed. The test signal is a "pseudo-random binary sequence" (PRBS). A spectral component of the sequence corresponding to a channel under investigation is removed prior to application of the sequence to the device under test.

The present invention relies on the discrete spectral nature of a PRBS. The PRBS provides a test signal which comprises a large number of frequencies and enables an assessment of an SCM network to be made which is more representative of real traffic than known arrangements. At any one of the given discrete frequencies present in the PRBS, a further contribution from system non-linearities can be introduced.

BRIEF DESCRIPTION OF THE DRAWINGS

The foregoing features and advantages of the invention will be apparent from the following detailed description of a preferred embodiment as illustrated in the accompanying drawings wherein.

DETAILED DESCRIPTION OF THE INVENTION

Figure 1:
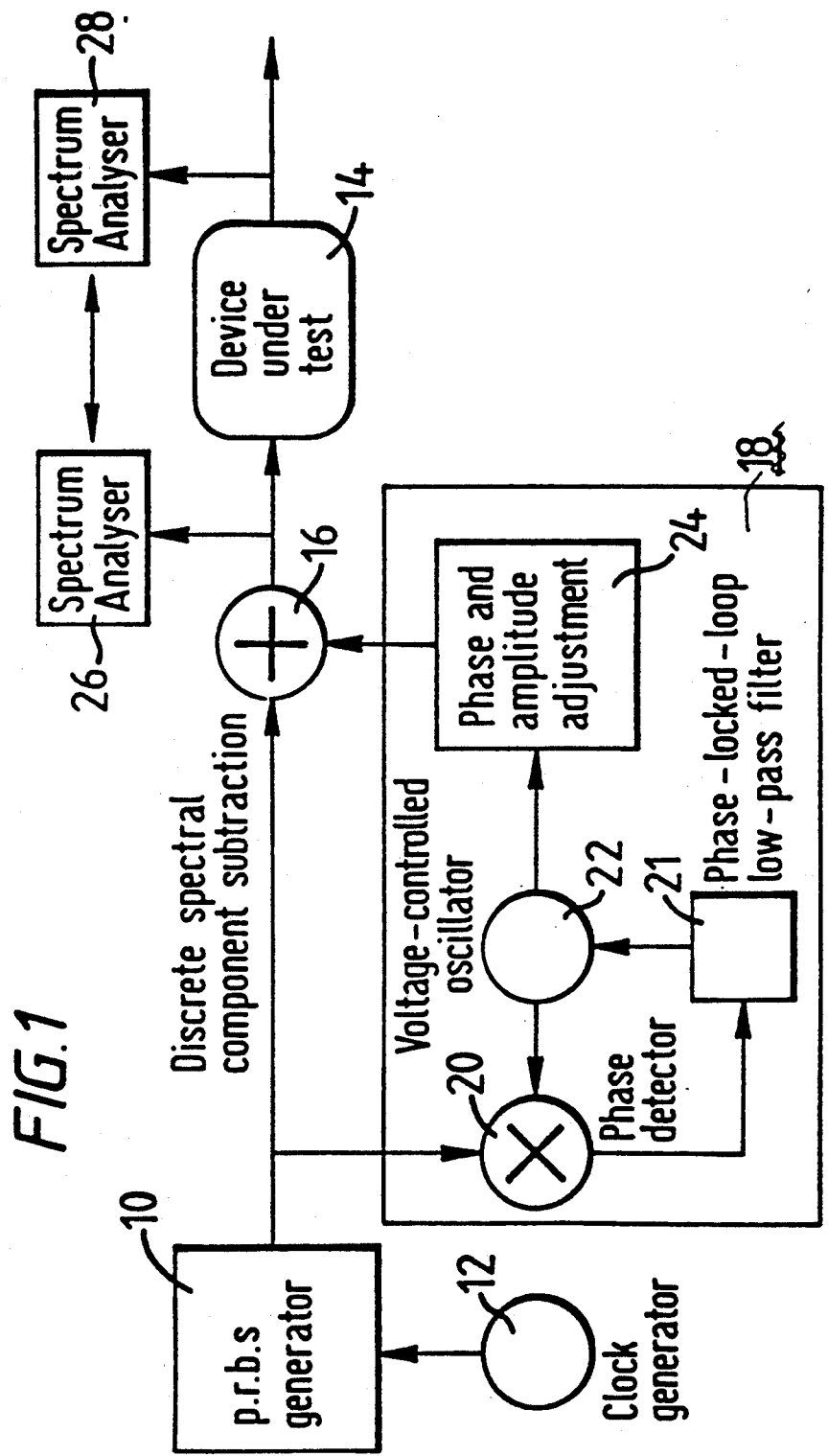
FIG. 1 is a block diagram of a test arrangement in accordance with the present invention.

Referring to FIG. 1, a measurement arrangement in accordance with the present invention comprises a PRBS generator 10, which is driven by a clock generator 12. The output of the PRBS generator is applied to a device under test 14, via a circuit 16 which, as described hereinabove, can remove from the PRBS a discrete spectral component. This component corresponds to the channel under test. The output of the PRBS generator is also applied to a phase locked loop circuit 18 which is used to generate a signal for cancelling the discrete spectral component. The phase locked loop is of conventional form and comprises a phase detector 20, a phase locked loop low pass filter 21, a voltage controlled oscillator 22 and a phase and amplitude adjustment element 24. The cancellation signal generated by the phase locked loop circuit is output to circuit 16. The signal provided by the circuit 16 is applied to a spectrum analyzer 26 and the signal from the device under test is applied to a spectrum analyzer 28.

In use the test signal for evaluating the device under test 14 is generated by the PRBS generator. The phase locked loop generates a cancellation signal which is applied to element 16 to effectively cancel the component of the PRBS signal at the test frequency. Since there should be no signal present at the test frequency prior to applying the test signal to the device under test 14, cancellation is required for accurate test results.

Figure 2:
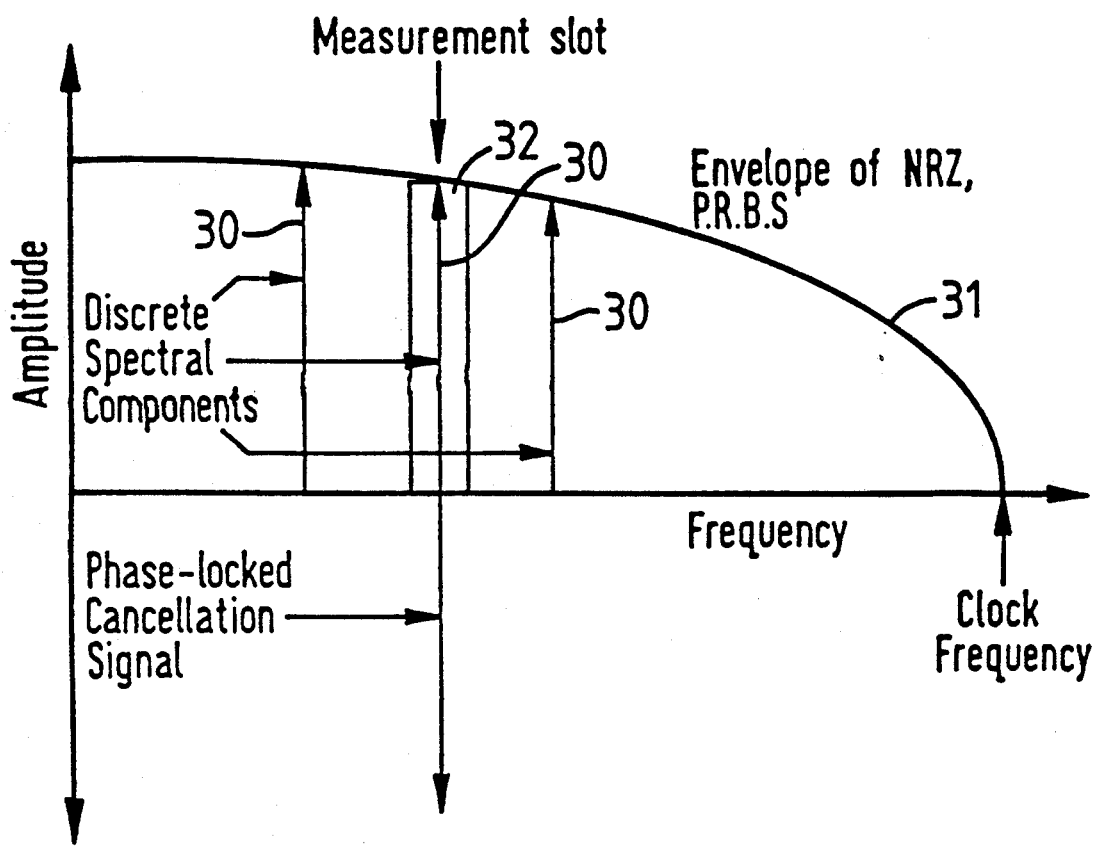
FIG. 2 illustrates the operation of the device of FIG. 1.

As shown in FIG. 2, a PRBS is made up of a plurality of discrete spectral components 30 within an envelope 31. A measurement slot 32 is created corresponding to one of the components. A contribution from system non-linearities can be detected in the measurement slot corresponding to one of the given discrete frequencies.

The test signal comprises a large number of frequencies and these can be used to make a realistic assessment of the network non-linearity when it is operating with real traffic. A feature of the arrangement is the phase-locked extraction which is acquired from the transmitted PRBS. This means that no separate reference signal is required and, hence, the method is very suitable for sub-carrier network assessment in practical field applications. Additionally, because there is no requirement for a conducting transmission medium, lock acquisition and cancellation signal injection may be applied to installed fiber systems with appropriate optoelectronic interfaces.

The PRBS can be extracted in optical form from the SCM network and used to provide the appropriate phase-locked signal. Once a given PRBS spectral component has been selected, this component is cancelled by re-injection of the single frequency optical signal by the phase amplitude and adjustment element 24. The spectrum analyzer 26 is used to verify that this cancellation has occurred. The spectrum analyzer 28 provides an indication of any non-linear effect by monitoring the signal emitted by the device under test.

Figure 3:
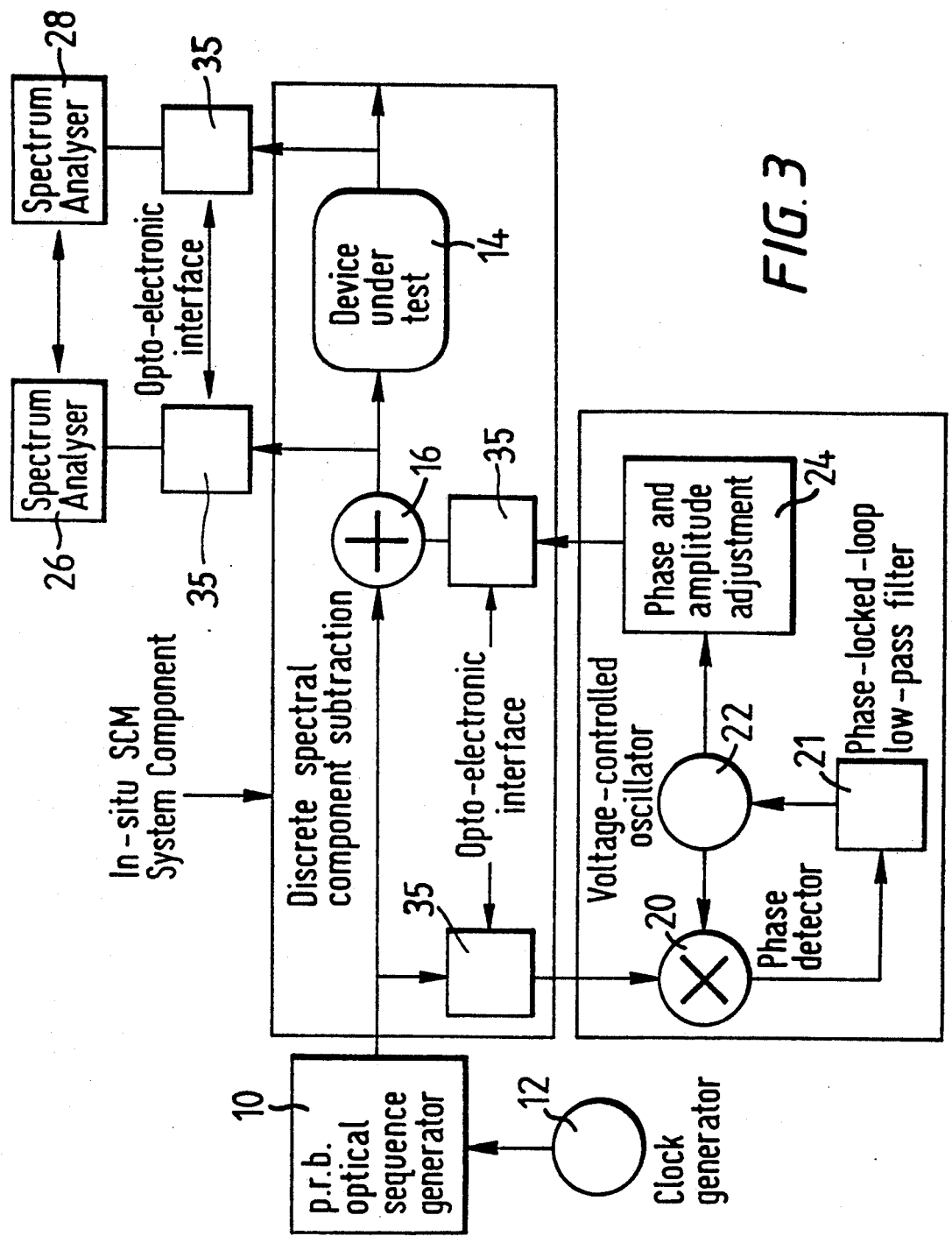
FIG. 3 is an alternative to the arrangement of FIG. 1.

FIG. 3 shows an arrangement corresponding to that of FIG. 1 which includes opto-electronic interfaces 35 enabling the PRBS to be extracted in optical form.

Figure 4:
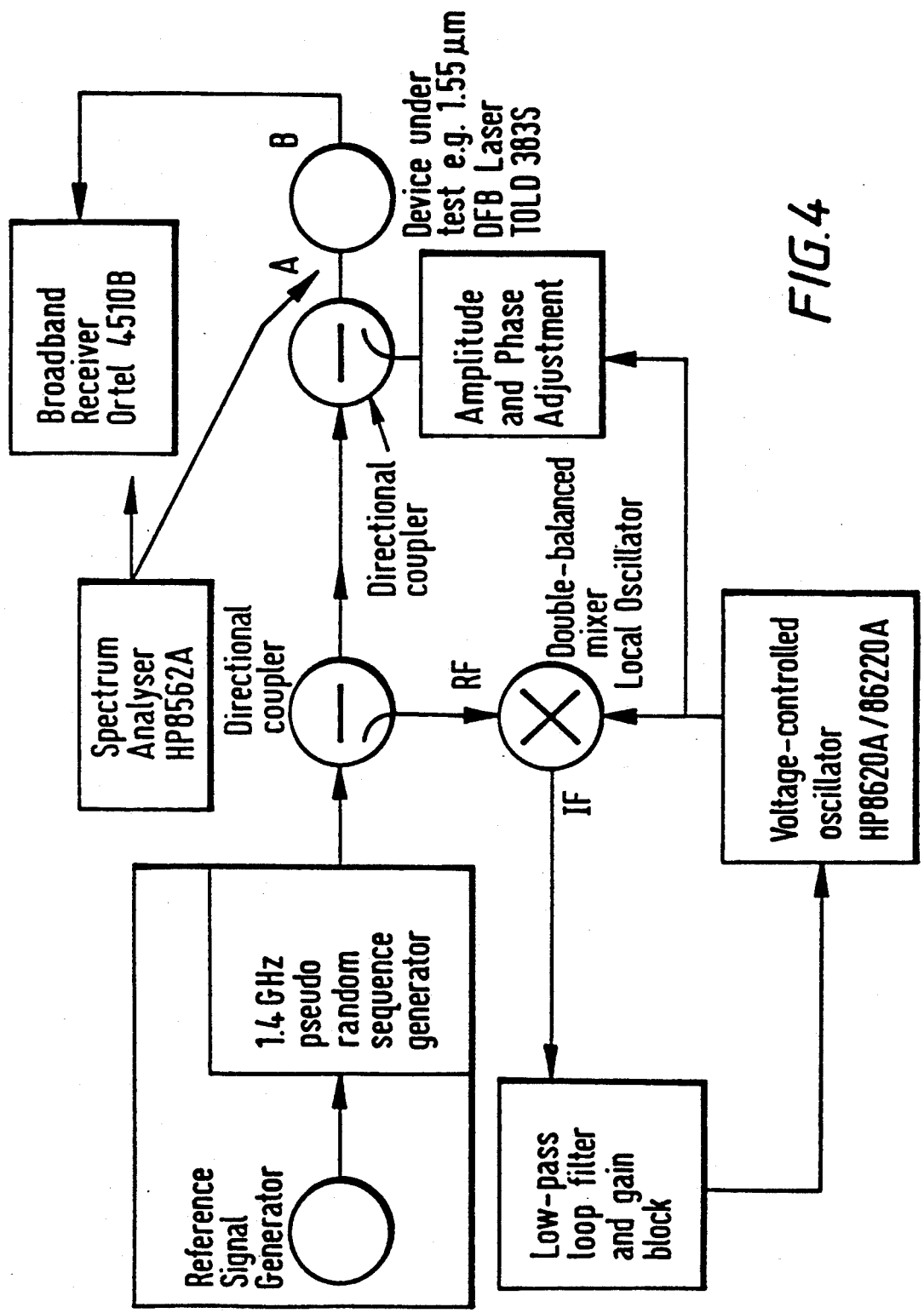
FIG. 4 is a block diagram of a preferred embodiment of the invention.
Figure 5A:
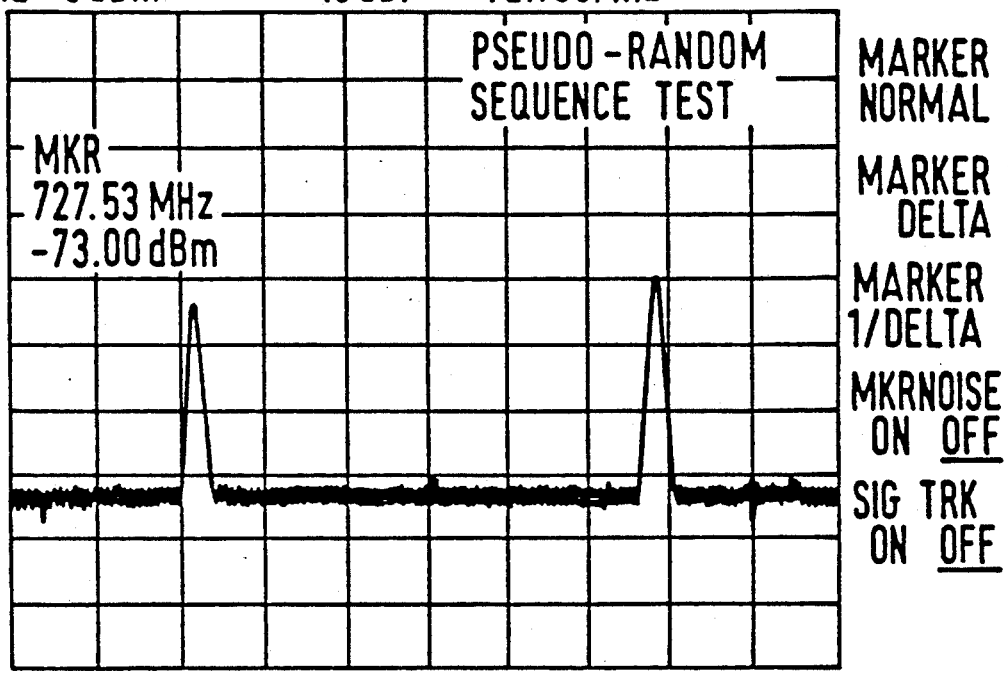
FIG. 5 graphically illustrates the results obtained from the apparatus of FIG. 4.
Figure 5B:
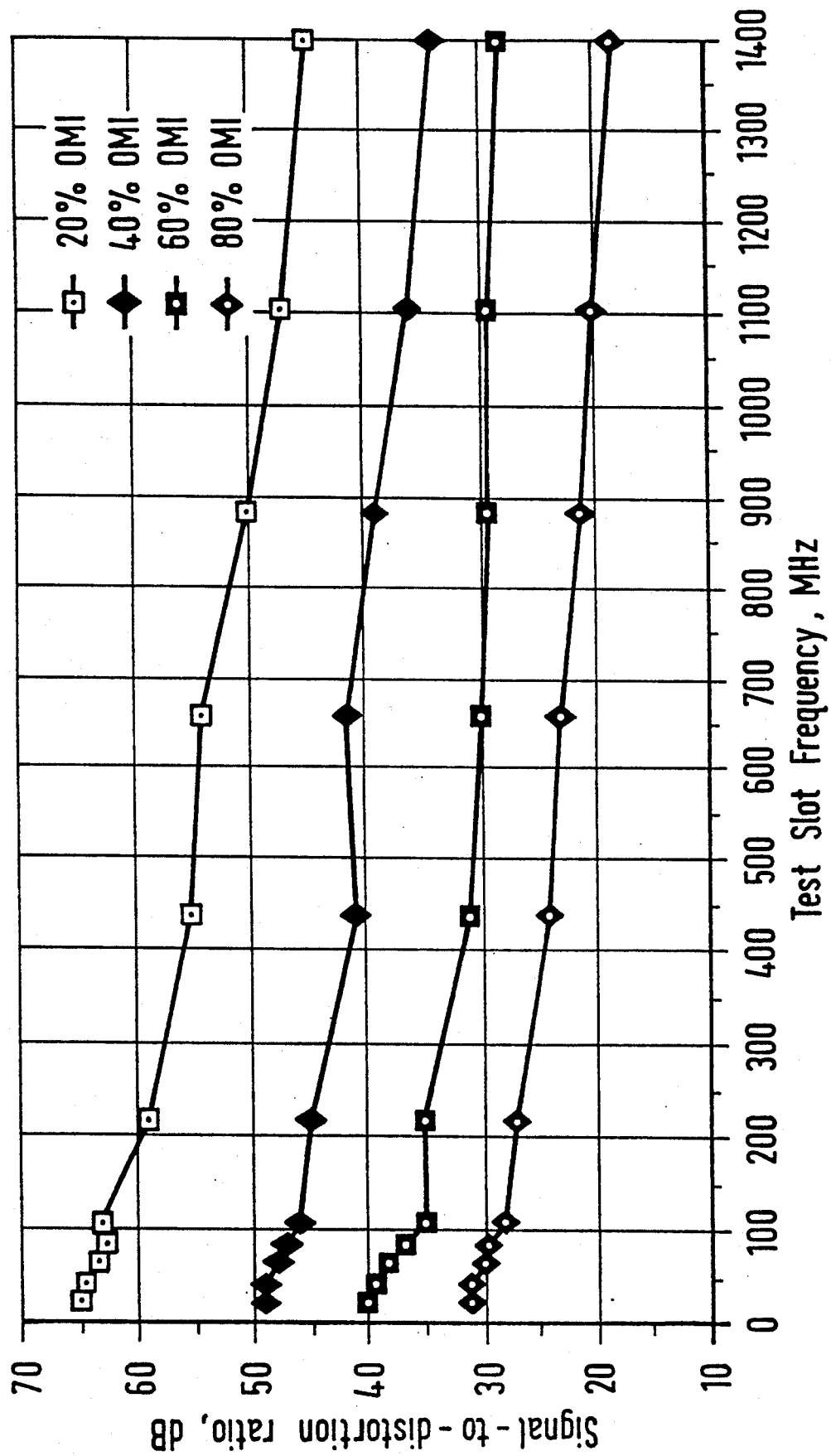

FIG. 4 shows an example of a test apparatus used to carry out a preliminary distortion measurement on a packaged, tailed, isolated 1.55 μm DFB laser (Toshiba TOLD383S). The 1.4 GBit/s, NRZ, $2^7-1$, PRBS consists of 127 discrete spectral components at 11.024 MHz spacing within a 1.4 GHz bandwidth. For a 0dBm generator output level, the RMS power of each component is approximately −21dBm. The test signal was injected at point A and measurements were carried out at B. FIG. 5a is an illustrative spectrogram of a 1.4 GBit/s, $2^7-1$, NRZ PRBS test sequence segment with a 727.53 MHz component removed. FIG. 5b shows the measured signal to-distortion ratio over a 1.4 GHz frequency range with total optical modulation indices (OMI) ranging from 20-80%.

While the invention has been described and illustrated with reference to specific embodiments, those skilled in the art will recognize that modification and variations may be made without departing from the principles of the invention as described herein above and set forth in the following claims.

I claim:

1. A method of measuring characteristics of a device in an optical network, the method comprising the following steps:
   (a) applying a test signal to a device under test, the test signal being a pseudo-random binary sequence;
   (b) analyzing a resulting output from the device under test; and
   (c) removing a spectral component of the sequence corresponding to a channel under investigation prior to application of the sequence to the device under test.

2. The method recited in claim 1, wherein the network is a sub-carrier multiplexing network.

3. The method recited in claim 1, wherein the cancellation signal for removing the spectral component is generated using a phase locked loop circuit.

4. The method recited in claim 2, wherein a cancellation signal for removing the spectral component is generated using a phase locked loop circuit.

5. The method recited in claim 4, wherein the pseudo random binary sequence is extracted in optical form from the sub-carrier multiplexing network and coupled to the phase locked loop circuit to provide the cancellation signal.

6. An apparatus for measuring characteristics of a device in an optical network comprising:

(a) means for applying a test signal to a device under test, the test signal being a pseudo-random binary sequence;
   (b) means for analyzing a resulting output from the device under test; and
   (c) means for removing a spectral component of the sequence corresponding to a channel under investigation prior to application of the sequence to the device under test.

7. The apparatus recited in claim 6, wherein the network is a sub-carrier multiplexing network.

8. The apparatus recited in claim 6, wherein the means for removing the spectral component comprises a phase locked loop circuit for generating a cancellation signal.

9. The apparatus recited in claim 7, wherein the means for removing the spectral component comprises a phase locked loop circuit for generating a cancellation signal.

10. The apparatus recited in claim 9, wherein the pseudo-random binary sequence is extracted in optical form from the sub-carrier multiplexing network and coupled to the phase locked loop circuit.

11. A method of measuring characteristics of a device in an optical network, the method comprising the following steps:
    (a) applying a test signal to a device under test, the test signal being a pseudo-random binary sequence;
    (b) analyzing a resulting output from the device under test;
    (c) generating with a phase locked loop circuit a cancellation signal for removing a spectral component of the sequence corresponding to a channel under investigation; and
    (d) removing said spectral component of the sequence in response to said cancellation signal prior to application of the sequence to the device under test.

12. The method recited in claim 11, wherein the network is a sub-carrier multiplexing network.

13. The method recited in claim 12, wherein the pseudo-random binary sequence is extracted in optical form from the sub-carrier multiplexing network and coupled to the phase locked loop circuit to provide the cancellation signal.

14. An apparatus for measuring characteristics of a device in an optical network comprising:
    (a) means for applying a test signal to a device under test, the test signal being pseudo-random binary sequence;
    (b) means for analyzing a resulting output from the device under test;
    (c) means comprising a phase locked loop circuit for generating a cancellation signal for removing a spectral component of the sequence corresponding to a channel under investigation; and
    (d) means for removing said spectral component of the sequence in response to said cancellation signal prior to application of the sequence to the device under test.

15. An apparatus recited in claim 14, wherein the network is a sub-carrier multiplexing network.

16. The apparatus recited in claim 14, wherein the pseudo-random binary sequence is extracted in optical form from the sub-carrier multiplexing network and coupled to the phase locked loop circuit.

* * * * *

UNITED STATES PATENT AND TRADEMARK OFFICE
CERTIFICATE OF CORRECTION

PATENT NO. : 5,157,652
DATED : October 20, 1992
INVENTOR(S) : Walker

It is certified that error appears in the above-identified patent and that said Letters Patent is hereby corrected as shown below:

In column 3, line 54, after "wherein" delete "the" and substitute --a--.

Signed and Sealed this

Twenty-ninth Day of March, 1994

BRUCE LEHMAN

Attest:

Attesting Officer

Commissioner of Patents and Trademarks